United States Patent
Taguchi

(10) Patent No.: US 7,498,366 B2
(45) Date of Patent: Mar. 3, 2009

(54) RUBBER COMPOSITION FOR SIDEWALL AND PNEUMATIC TIRE HAVING SIDEWALL USING SAME

(75) Inventor: Takafumi Taguchi, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/819,142

(22) Filed: Jun. 25, 2007

(65) Prior Publication Data

US 2008/0009595 A1    Jan. 10, 2008

(30) Foreign Application Priority Data

Jul. 7, 2006    (JP) ............................... 2006-187846

(51) Int. Cl.
*C08K 5/00*    (2006.01)

(52) U.S. Cl. ........................................ 524/83; 524/487

(58) Field of Classification Search ................. 524/487, 524/83
See application file for complete search history.

(56) References Cited

U.S. PATENT DOCUMENTS 5,284,896 A    2/1994    Shimada et al.

FOREIGN PATENT DOCUMENTS

| EP | 0867472 A1 | 9/1998 |
|---|---|---|
| EP | 1288022 A1 | 3/2003 |
| EP | 1288253 A1 | 3/2003 |
| EP | 1300437 A1 | 4/2003 |
| JP | 11-181150 A | 7/1999 |
| JP | 2000-273243 A | 10/2000 |
| JP | 2003-63206 A | 3/2003 |
| JP | 2006-70093 A | 3/2006 |
| JP | 2006-89612 A | 4/2006 |

*Primary Examiner*—Peter D Mulcahy
(74) *Attorney, Agent, or Firm*—Birch, Stewart, Kolasch & Birch, LLP

(57) ABSTRACT

The present invention provides a rubber composition for a sidewall excellent in appearance and weather resistance, and a tire having a sidewall prepared by using the rubber composition. The rubber composition for a sidewall of the present invention comprises 45 to 60 parts by weight of a carbon black, not more than 1.5 parts by weight of powder sulfur, not more than 0.75 part by weight of a sulfenamide vulcanization accelerator and 0.7 to 1.5 parts by weight of paraffin wax in which the distribution of the number of carbon atoms is 20 to 50, the ratio (iso content/normal content) of iso content to normal content is 5/95 to 20/80, the standard deviation/average number of carbon atoms of the iso content is 1.0 to 1.8 and the standard deviation/average number of carbon atoms of the normal content is 1.0 to 1.8, based on 100 parts by weight of a rubber component comprising a butadiene rubber in an amount of 35 to 55% by weight and a natural rubber.

2 Claims, No Drawings

RUBBER COMPOSITION FOR SIDEWALL AND PNEUMATIC TIRE HAVING SIDEWALL USING SAME

BACKGROUND OF THE INVENTION

The present invention relates to a rubber composition for a sidewall and a pneumatic tire having a sidewall prepared using the composition.

So far a sidewall has been subject to degradation in its appearance due to ozone and ultraviolet rays in the air when used for a long period of time and cracks were occasionally generated on the sidewall. Further, migration of wax and an antioxidant compounded to its surface occurred, which often caused discoloration of tires and damaged the aesthetic aspect of tires.

As a procedure to overcome these problems, it has been known to compound wax which migrates to a tire surface and forms a film to physically prevent deterioration by ozone, etc. However, in such a case, there has been no specific measure as to how the composition of wax should be. Further, when inappropriate wax was compounded, there was a case where appearance of tires was damaged.

Further, as a means for preventing cracking attributable to ozone, it has been also known that a large amount of antioxidants is compounded. However, in this case, there has been a problem that the antioxidants are scattered and lost at an early stage of use and their effect cannot be maintained until the end of use.

JP2006-89612A discloses a rubber composition containing specified amounts of a rubber component, paraffin wax and a gelation agent and preferably used for a tread and a sidewall. However, a ratio of iso content to normal content of the wax to be used is not prescribed, and no consideration is made as to the point that a particularly superior effect is obtained by using a specific wax.

JP11-181150A discloses a rubber composition which is suitably used for a tread or a sidewall and comprises a rubber component and wax comprising normal paraffin in an amount of 75 to 85% by weight and iso paraffin. However, there are not described ratios of standard deviation/average number of carbon atoms of iso content and normal content of the wax being used, and no consideration is made as to the point that a particularly superior effect is obtained by using a specific wax.

Namely, there is no concept disclosed in JP2006-89612A and JP11-181150A with respect to spreading of iso content and normal content of wax being used and improvements are still required in an aesthetic aspect of tires.

SUMMARY OF THE INVENTION

It is an object of the present invention to provide a rubber composition for a sidewall superior in appearance and weather resistance and a pneumatic tire having a sidewall prepared using the composition.

The present invention relates to a rubber composition for a sidewall comprising 45 to 60 parts by weight of a carbon black, not more than 1.5 parts by weight of powder sulfur, not more than 0.75 part by weight of a sulfenamide vulcanization accelerator and 0.7 to 1.5 parts by weight of paraffin wax, in which a distribution of the number of carbon atoms is 20 to 50, a ratio (iso content/normal content) of iso content to normal content is 5/95 to 20/80, and in the distribution of the number of carbon atoms of each of the iso content and the normal content, a standard deviation/average number of carbon atoms of the iso content is 1.0 to 1.8 and a standard deviation/average number of carbon atoms of the normal content is 1.0 to 1.8, based on 100 parts by weight of a rubber component comprising a butadiene rubber in an amount of 35 to 55% by weight and a natural rubber.

The present invention also relates to a pneumatic tire having a sidewall prepared using the aforementioned rubber composition for a sidewall.

DETAILED DESCRIPTION

The rubber composition for a sidewall of the present invention comprises a rubber component, a carbon black, powder sulfur, a vulcanization accelerator and paraffin wax.

The rubber component comprises a natural rubber (NR) and a butadiene rubber (BR).

NR is not particularly limited and those generally used in the tire industry such as SIR20, RSS#3 and TSR20 can be used.

A content of NR in the rubber component is preferably not less than 35% by weight, more preferably not less than 45% by weight. When the content of NR is less than 35% by weight, no adequate scratch resistance tends to be obtained. Further, the content of NR is preferably not more than 65% by weight, more preferably not more than 60% by weight. When the content of NR exceeds 65% by weight, it leads to reduction of an amount of BR and no adequate crack growth resistance tends to be obtained.

As for BR, exemplified are BR with a high cis content such as BR130B and BR150B available from Ube Industries Ltd., and BR containing syndiotactic polybutadiene crystals such as VCR412 and VCR617 available from Ube Industries Ltd., but BR is not specifically limited.

A content of BR in the rubber component is not less than 35% by weight, preferably not less than 40% by weight. When the content of BR is less than 35% by weight, adequate crack growth resistance is not obtained. Further, the content of BR is not more than 55% by weight, preferably not more than 50% by weight. When the content of BR exceeds 55% by weight, it leads to increase in an amount of NR and adequate scratch resistance is not obtained.

As for the rubber component, in addition to NR and BR, exemplified are, for example, a styrene-butadiene rubber (SBR), an isoprene rubber (IR), a butyl rubber (IIR), a halogenated butyl rubber (X-IIR), a chloroprene rubber (CR), an acrylonitrile-butadiene rubber (NBR), an ethylene-propylene-diene rubber (EPDM), a styrene-isoprene-butadiene rubber (SIBR), a halogenated product of a copolymer of isomonoolefin with p-alkylstyrene. However, it is preferable that a rubber component other than NR and BR is not contained, from the viewpoint of bending crack growth resistance and rolling resistance of tires.

Carbon black is not particularly limited and those that have been used in the tire industry can be used.

An amount of carbon black is not less than 45 parts by weight, preferably not less than 50 parts by weight based on 100 parts by weight of the rubber component. When the amount of carbon black is less than 45 parts by weight, adequate reinforcing property of the rubber is not obtained. Further, the amount of carbon black is not more than 60 parts by weight, preferably not more than 55 parts by weight. When the amount of carbon black exceeds 60 parts by weight, rolling resistance of the tires is increased and the fuel consumption becomes large.

Powder sulfur is not particularly limited and those that have been used in the tire industry can be used.

An amount of powder sulfur is not more than 1.5 parts by weight, preferably not more than 1.45 parts by weight based on 100 parts by weight of the rubber component. When the amount of powder sulfur exceeds 1.5 parts by weight, hardening of the rubber occurs by an influence of thermal degradation generated during running. Further, the amount of powder sulfur is preferably not less than 1.20 parts by weight, more preferably not less than 1.25 parts by weight. When the amount of powder sulfur is less than 1.20 parts by weight, vulcanization does not adequately proceed and no adequate rubber strength tends to be exhibited.

There are many compounds used as a vulcanization accelerator, and among them, a sulfenamide vulcanization accelerator is used because stable scorch-suppressing property and an appropriate vulcanization speed are obtained for a rubber composition prepared using a diene rubber.

Examples of the sulfenamide vulcanization accelerator are N-tert-butyl-2-benzothiazolylsulfenamide (for example, NOCCELER NS available from Ouchi Shinko Chemical Industrial CO., LTD.), N-cyclohexyl-2-benzothiazolylsulfenamide (for example, NOCCELER CZ available from Ouchi Shinko Chemical Industrial CO., LTD.), N,N'-dicyclohexyl-2-benzothiazolylsulfenamide (for example, NOCCELER DZ available from Ouchi Shinko Chemical Industrial CO., LTD.).

An amount of sulfenamide vulcanization accelerator is not more than 0.75 part by weight, preferably not more than 0.5 part by weight based on 100 parts by weight of the rubber component. When the amount of sulfenamide vulcanization accelerator exceeds 0.75 part by weight, the vulcanization proceeds in a semi EV vulcanization system (low-sulfur high-vulcanization accelerator system) and stress relaxation after the vulcanization is difficult. Further, the amount of sulfenamide vulcanization accelerator is preferably not less than 0.4 part by weight, more preferably not less than 0.45 part by weight. When the amount of sulfenamide vulcanization accelerator is less than 0.4 part by weight, the vulcanization speed is too low and no adequate rubber strength tends to be obtained.

The rubber composition for a sidewall of the present invention is featured by comprising the paraffin wax exhibiting specified values of (1) a distribution of the number of carbon atoms, (2) a ratio of iso content to normal content, (3) a standard deviation/average number of carbon atoms of the iso content, and (4) a standard deviation/average number of carbon atoms of the normal content in a specified amount (5).

These features (1) to (5) of the paraffin wax used in the present invention are explained in detail in the following.

The paraffin wax of the present invention means a hydrocarbon compound containing no unsaturated bond. In the present invention, one referred to as wax also means the paraffin wax unless specifically mentioned otherwise.

Examples of general paraffin wax are OZOACE 0355 available from NIPPON SEIRO CO., LTD., OK5258H available from PARAMELT CO., LTD., Renox 2101, SANNOC N available from Ouchi Shinko Chemical Industrial CO., LTD. and the like.

(1) Distribution of the Number of Carbon Atoms of Paraffin Wax

In the present invention, the distribution of the number of carbon atoms of the paraffin wax represents a weight frequency distribution of components with respect to each number of carbon atoms within the hydrocarbon compounds having about 20 to 50 carbon atoms.

In the present invention, the paraffin wax having the number of carbon atoms of 20 to 50 is one containing a paraffin wax having the number of carbon atoms of 20 to 50 in an amount of not less than 95% by weight. When a paraffin wax having the number of carbon atoms of less than 20 is contained in a large amount, it is dissolved into the rubber and does not bleed out on the rubber surface, and when a paraffin wax having the number of carbon atoms of more than 50 is contained in a large amount, migration thereof is slow and it takes a long period of time to be precipitated. For the reason mentioned above, it is necessary that in the present invention, the paraffin wax having the number of carbon atoms of 20 to 50 is contained in an amount of not less than 95% by weight.

It is preferable that both of iso content and normal content are broadly distributed over the whole region of the number of carbon atoms of 20 to 50. When they are not distributed broadly, effective film formation over all temperature ranges tends not to be formed.

In the present invention, the number of carbon atoms of the paraffin wax being broadly distributing in the whole region of the number of carbon atoms means that the value of:

Standard deviation of distribution of the number of carbon atoms÷Average number of carbon atoms is large, and the number of carbon atoms of the paraffin wax not being broadly distributing in the whole region of the number of carbon atoms means that the value of:

Standard deviation of distribution of the number of carbon atoms÷Average number of carbon atoms is small. The standard deviation and average number of carbon atoms in the distribution of the number of carbon atoms are explained in the following (3) and (4).

(2) Ratio of Iso Content to Normal Content of Paraffin Wax

In the present invention, the iso content of the paraffin wax means a saturated hydrocarbon (isoparaffin) having a branch (having a trunk chain and branched chain), and the normal content of the paraffin wax means a saturated hydrocarbon (normal paraffin) having no branch (having only a trunk chain).

It is necessary that the ratio (iso content/normal content) of iso content to normal content of the paraffin wax is 5/95 to 20/80. The ratio is preferably 10/90 to 15/85. When the iso content/normal content of the paraffin wax is less than 5/95, the bending resistance of the film is not adequate and therefore it is cracked to permit the invasion of ozone. Further, when the iso content/normal content of the paraffin wax exceeds 20/80, the film prepared on the tire surface becomes oily and dust in air adheres thereto during running to damage appearance.

(3) Standard Deviation/Average Number of Carbon Atoms of Iso Content of Paraffin Wax In the present invention, the average number of carbon atoms of the iso content of the paraffin wax means the weight average number of carbon atoms of the iso content. The weight average number of carbon atoms of the iso content of the paraffin wax is preferably 30 to 45, more preferably 32 to 40 for the reason that the paraffin wax is easily precipitated on the tire surface.

In the present invention, a weight percentage (%) of the iso content of the paraffin wax can be represented by:

Content of iso paraffin÷Content of whole paraffin× 100

The weight percentage (%) of the iso content of the paraffin wax is preferably 5 to 20, more preferably 10 to 15 from the viewpoint of flexibility of the precipitated wax.

In the present invention, the standard deviation of the iso content of the paraffin wax means a value obtained by extracting the square root of the sum of (each number of carbon atoms–average number of carbon atoms)$^2$. The standard deviation of the iso content of the paraffin wax is preferably not less than 15, more preferably not less than 20 for the reason that the paraffin wax can be precipitated in various temperature ranges.

In the distribution of the number of carbon atoms of the iso content of the present invention, the value of standard deviation/average number of carbon atoms of the iso content of the paraffin wax represents a distribution of components having each number of carbon atoms. The larger the value is, the broader the distribution is.

The standard deviation/average number of carbon atoms of the iso content of the paraffin wax is not less than 1.0, preferably not less than 1.05. When the standard deviation/average number of carbon atoms of the iso content of the paraffin wax is less than 1.0, spreading is too small and the paraffin wax cannot be bloomed over all temperature ranges. Further, the standard deviation/average number of carbon atoms of the iso content of the paraffin wax is not more than 1.8, preferably not more than 1.75. When the standard deviation/average number of carbon atoms of the iso content of the paraffin wax exceeds 1.8, scattering of data is too large and the component to be effectively bloomed is lessened.

(4) Standard Deviation/Average Number of Carbon Atoms of Normal Content of Paraffin Wax In the present invention, the average number of carbon atoms of the normal content of the paraffin wax means the weight average number of carbon atoms of the normal content. The weight average number of carbon atoms of the normal content of the paraffin wax is preferably 25 to 35, more preferably 27 to 33 from the viewpoint of migration property.

In the present invention, a weight percentage (%) of the normal content of the paraffin wax can be represented by:

Content of normal paraffin÷Content of whole paraffin×100

The weight percentage (%) of the normal content of the paraffin wax is preferably not less than 80%, more preferably not less than 85% from the viewpoint of migration property of the wax.

In the present invention, the standard deviation of the normal content of the paraffin wax means a value obtained by extracting the square root of the sum of (each number of carbon atoms–average number of carbon atoms)$^2$. The standard deviation of the normal content of the paraffin wax is preferably not less than 15, more preferably not less than 20 for the reason that the paraffin wax can be precipitated in various temperature ranges.

In the distribution of the number of carbon atoms of the normal content of the present invention, the value of standard deviation/average number of carbon atoms of the normal content of the paraffin wax represents a distribution of components having each number of carbon atoms. The larger the value is, the broader the distribution is.

The standard deviation/average number of carbon atoms of the normal content of the paraffin wax is no less than 1.0, preferably not less than 1.05. When the standard deviation/average number of carbon atoms of the normal content of the paraffin wax is less than 1.0, spreading is too small and it cannot cover all temperature ranges. Further, the standard deviation/average number of carbon atoms of the normal content of the paraffin wax is not more than 1.8, preferably not more than 1.75. When the standard deviation/average number of carbon atoms of the normal content of the paraffin wax exceeds 1.8, spreading is too large and the amount of wax capable of blooming is lessened.

(5) Amount of Paraffin Wax

The amount of paraffin wax is not less than 0.7 part by weight, preferably not less than 1.2 parts by weight based on 100 parts by weight of the rubber component. The amount of paraffin wax of less than 0.7 part by weight is too small, and effective film formation cannot be achieved. The amount of paraffin wax is not more than 1.5 parts by weight. When the amount of paraffin wax exceeds 1.5 parts by weight, a large amount of the paraffin wax is bloomed, dusts adhere thereon and the appearance of tires is damaged.

Paraffin wax used in the present invention is not limited particularly as far as the aforementioned features (1) to (4) are satisfied because a film exhibiting ozone resistance effectively over all temperature ranges can be formed and an adequate blooming amount can be obtained, thus making it possible to enhance appearance of tires.

Examples of paraffin wax which satisfies the aforementioned features (1) to (4) and can be preferably used are, for instance, OZOACE 0355 available from NIPPON SEIRO CO., LTD. and OK5258H available from PARAMELT CO., LTD.

In the rubber composition for a sidewall of the present invention, compounding agents, for example, an adhesion imparting agent, an antioxidant, stearic acid and zinc oxide that have been used in the tire industry can be suitably compounded as case demands, in addition to the aforementioned rubber component, carbon black, powder sulfur, vulcanization accelerator and paraffin wax.

The pneumatic tire of the present invention is produced by a usual method using the rubber composition for a sidewall of the present invention. Namely, the rubber composition for a sidewall of the present invention in which various additives are compounded according to necessity is extruded and processed into a shape of a sidewall at unvulcanized stage, laminated with other tire members on a tire molding machine and molded by a usual method to form unvulcanized tires, and then, the pneumatic tires of the present invention can be produced by heating and pressurizing the unvulcanized tires in a vulcanizer.

EXAMPLES

The present invention is explained in detail based on Examples, but the present invention is not limited only to these.

Various chemicals used in Example and Comparative Examples are explained below.

Natural rubber (NR): SIR 20

Butadiene rubber (BR): BR150B available from Ube Industries Ltd.

Carbon black: DIABLACK HA available from Mitsubishi Chemical Corporation

Wax (1): OZOACE 0355 available from NIPPON SEIRO CO., LTD.

Wax (2): OK5258H available from PARAMELT CO., LTD.

Wax (3): Renox 2101

Adhesion imparting resin: PETCOAL LX available from Tosoh Corporation

Antioxidant: Vulcanox 4020 available from Bayer AG

Stearic acid: Stearic acid "TSUBAKI" available from NOF CORPORATION

Zinc oxide: Zinc oxide No. 2 available from Mitsui Mining and Smelting Company, Limited Powder sulfur: Powder sulfur available from Tsurumi Chemical Industry Co., Ltd.

Vulcanization accelerator: SUNCELER CM (N-cyclohexyl-2-benzothiazolylsulfenamide) available from Sanshin Chemical Industry CO., LTD.

The respective characteristic values of the wax (1) to (3) are shown in Table 1.

TABLE 1

|  | Wax (1) OZOACE 0355 | | Wax (2) OK 5258H | | Wax (3) Renox 2101 | |
| --- | --- | --- | --- | --- | --- | --- |
|  | Iso content | Normal content | Iso content | Normal content | Iso content | Normal content |
| Average number of carbon atoms | 39.42 | 31.54 | 33.86 | 32.43 | 35.66 | 31.38 |
| Weight percentage (%) | 13.88 | 86.11 | 10.32 | 89.66 | 26.31 | 73.68 |
| Standard deviation | 43.3 | 54.2 | 45.3 | 49.2 | 29 | 30 |
| Standard deviation/Average number of carbon atoms | 1.10 | 1.72 | 1.34 | 1.52 | 0.81 | 0.96 |

Examples 1 to 5 and Comparative Examples 1 to 5

Chemicals other than sulfur and a vulcanization accelerator were kneaded according to the compounding prescription shown in Table 2 under the condition of 160° C. for 3 minutes using a Banbury mixer, to obtain kneaded products. Then, sulfur and a vulcanization accelerator were added to the obtained kneaded products, and kneaded under the condition of 100° C. for 5 minutes using an open roll, to obtain unvulcanized rubber compositions. Further, the obtained unvulcanized rubber compositions were molded into a shape of a sidewall, laminated with other tire members on a tire molding machine to form unvulcanized tires, and press-vulcanized under the condition of 150° C. for 40 minutes to produce test tires (size: 11R22.5 14P) of Examples 1 to 5 and Comparative Examples 1 to 5.

(Appearance)

The produced test tires were placed outdoor for 180 days while they were sheltered from rain. After that, appearance was visually observed and evaluated by 4 stages.
◎: No discoloration
○: Partially discolored
Δ: Discolored on the most part
x: Discolored over the whole tire (Ozone Crack Test)

The test tires obtained by the above-mentioned preparation method were placed under the conditions of a temperature of 40° C., an ozone concentration of 50 ppm and an elongation rate of 20% in accordance with JIS K6259 "Vulcanized rubber and Thermoplastic rubber—Determination of ozone resistance", and the state of crack in the sidewall of the test tires was evaluated.

◎: No crack was visually observed.
○: A small number of cracks were visually observed.
Δ: A large number of cracks were visually observed.
x: A large number of large and deep cracks were visually observed.

Evaluation results of the above-mentioned tests are shown in Table 2.

TABLE 2

|  | Ex. | | | | | Com. Ex | | | | |
| --- | --- | --- | --- | --- | --- | --- | --- | --- | --- | --- |
|  | 1 | 2 | 3 | 4 | 5 | 1 | 2 | 3 | 4 | 5 |
| Amounts (part by weight) | | | | | | | | | | |
| NR | 60 | 60 | 60 | 60 | 60 | 60 | 60 | 60 | 60 | 60 |
| BR | 40 | 40 | 40 | 40 | 40 | 40 | 40 | 40 | 40 | 40 |
| Carbon black | 50 | 50 | 50 | 50 | 50 | 50 | 50 | 50 | 50 | 50 |
| Adhesion imparting resin | 3 | 3 | 3 | 3 | 3 | 3 | 3 | 3 | 3 | 3 |
| Wax (1) | 1.5 | — | 0.7 | 1 | 1.2 | — | 1.5 | 1.5 | 0.5 | 2 |
| Wax (2) | — | 1.5 | — | — | — | — | — | — | — | — |
| Wax (3) | — | — | — | — | — | 1.5 | — | — | — | — |
| Antioxidant | 3 | 3 | 3 | 3 | 3 | 3 | 3 | 3 | 3 | 3 |
| Stearic acid | 2 | 2 | 2 | 2 | 2 | 2 | 2 | 2 | 2 | 2 |
| Zinc oxide | 5 | 5 | 5 | 5 | 5 | 5 | 5 | 5 | 5 | 5 |
| Powder sulfur | 1.4 | 1.4 | 1.4 | 1.4 | 1.4 | 1.4 | 2 | 1.4 | 1.4 | 1.4 |
| Vulcanization accelerator | 0.5 | 0.5 | 0.5 | 0.5 | 0.5 | 0.5 | 0.5 | 1 | 0.5 | 0.5 |
| Evaluation Results | | | | | | | | | | |
| Appearance | ◎ | ◎ | ◎ | ◎ | ○ | Δ | ◎ | ◎ | ◎ | Δ |
| Ozone crack resistance | ◎ | ◎ | ○ | ◎ | ◎ | ○ | x | x | Δ | ◎ |

According to the present invention, there can be provided a rubber composition for a sidewall being superior in appearance and weather resistance as the composition comprises specified amounts of a specific rubber component, a carbon black, powder sulfur, a specific vulcanization accelerator and a specific paraffin wax, and also there can be provided a pneumatic tire having a sidewall prepared using the composition.

What is claimed is:
1. A rubber composition for a sidewall comprising
45 to 60 parts by weight of a carbon black,
not more than 1.5 parts by weight of powder sulfur,
0.45 to 0.5 parts by weight of N-cyclohexyl-2-benzothiazolylsulfenamide and

1.5 parts by weight of paraffin wax in which a distribution of the number of carbon atoms is 20 to 50, a ratio (iso content/normal content) of iso content to normal content is 5/95 to 20/80, and in the distribution of the number of carbon atoms of each of the iso content and the normal content, a standard deviation/average number of carbon atoms of the iso content is 1.0 to 1.8 and a standard deviation/average number of carbon atoms of the normal content is 1.0 to 1.8 based on 100 parts by weight of a rubber component comprising a butadiene rubber in an amount of 35 to 55% by weight and a natural rubber.

2. A pneumatic tire having a sidewall prepared by using the rubber composition for a sidewall of claim 1.

* * * * *